(12) United States Patent
Mauro et al.

(10) Patent No.: US 6,721,280 B1
(45) Date of Patent: Apr. 13, 2004

(54) METHOD AND APPARATUS FOR VOICE LATENCY REDUCTION IN A VOICE-OVER-DATA WIRELESS COMMUNICATION SYSTEM

(75) Inventors: Anthony Mauro, San Diego, CA (US); James Tomcik, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/551,920

(22) Filed: Apr. 19, 2000

(51) Int. Cl.[7] .......................... G01R 31/08; H04Q 7/00; H04J 3/16
(52) U.S. Cl. .................. 370/252; 370/328; 370/465
(58) Field of Search ............................... 370/229, 235, 370/465, 467, 412, 417, 332, 328, 335, 252, 253; 375/225; 704/200

(56) References Cited

U.S. PATENT DOCUMENTS 5,970,443 A    10/1999  Fujii
6,208,620 B1 *  3/2001  Sen et al. ................... 370/231
6,567,428 B1 *  5/2003  Rubin et al. ................ 370/538

FOREIGN PATENT DOCUMENTS

EP        0855699       1/1998

OTHER PUBLICATIONS

XP010162378 Delprat, Marc et al., "Advanced Speech Transmission Techniques For GSM And Beyond"; Vehicular Technology Conference; Apr. 26, 1996; Pages 208–212.

* cited by examiner

*Primary Examiner*—Duc Ho
(74) *Attorney, Agent, or Firm*—Philip R. Wadsworth; Gregory D. Ogrod; Thomas M. Thibault

(57) ABSTRACT

A method and apparatus for reducing voice latency in a voice-over-data wireless communication system. In a transmitter, audio information to be transmitted is first encoded using a voice encoder operating in a first mode of operation. At least one operating parameter in the transmitter is measured by a processor, the least one operating parameter proportional to a latency between the transmitter and receiver. If the at least one operational parameter exceeds a predetermined threshold, the voice encoder is instructed to operate in a second mode of operation. When the at least one operational parameter falls below a second predetermined threshold, the voice encoder is instructed to operate in the first mode of operation.

18 Claims, 3 Drawing Sheets

METHOD AND APPARATUS FOR VOICE LATENCY REDUCTION IN A VOICE-OVER-DATA WIRELESS COMMUNICATION SYSTEM

BACKGROUND OF THE INVENTION

I. Field of the Invention

The present invention pertains generally to the field of wireless communications, and more specifically to providing an efficient method and apparatus for reducing voice latency associated with a voice-over-data wireless communication system.

II. Background

The field of wireless communications has many applications including cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including frequency division multiple access (FDMA), time division multiple access (TDMA), and code division multiple access (CDMA). In connection therewith, various domestic and international standards have been established including Advanced Mobile Phone Service (AMPS), Global System for Mobile (GSM), and Interim Standard 95 (IS-95). In particular, IS-95 and its derivatives, such as IS-95A, IS-95B (often referred to collectively as IS-95), ANSI J-STD-008, IS-99, IS-657, IS-707, and others, are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459 entitled "System and Method for Generating Signal Waveforms in a CDMA Cellular Telephone System", which is assigned to the assignee of the present invention and incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTI-CHANNEL DEMODULATOR, which is assigned to the assignee of the present invention and incorporated herein by reference. In CDMA systems, over-the-air power control is a vital issue. An exemplary method of power control in a CDMA system is described in U.S. Pat. No. 5,056,109 entitled "Method and Apparatus for Controlling Transmission Power in A CDMA Cellular Mobile Telephone System" which is assigned to the assignee of the present invention and incorporated herein by reference.

A primary benefit of using a CDMA over-the-air interface is that communications are conducted simultaneously over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum.

Transmitting signals over the same RF spectrum provides various benefits including an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit between the coverage area of two or more base stations that involves simultaneosly interfacing with two or more base stations. (In contrast, hard handoff involves terminating the interface with a first base station before establishing the interface with a second base station.) An exemplary method of performing soft handoff is described in U.S. Pat. No. 5,267,261 entitled "Mobile Station Assisted Soft Handoff in a CDMA Cellular Communications System" which is assigned to the assignee of the present invention and incorporated herein by reference.

Under Interim Standards IS-99 and IS-657 (referred to hereinafter collectively as IS-707), an IS-95-compliant communications system can provide both voice and data communications services. Data communications services allow digital data to be exchanged between a transmitter and one or more receivers over a wireless interface. Examples of the type of digital data typically transmitted using the IS-707 standard include computer files and electronic mail.

In accordance with both the IS-95 and IS-707 standards, the data exchanged between a transmitter and a receiver is processed in discreet packets, otherwise known as data packets or data frames, or simply frames. To increase the likelihood that a frame will be successfully transmitted during a data transmission, IS-707 employs a radio link protocol (RLP) to track the frames transmitted successfully and to perform frame retransmission when a frame is not transmitted successfully. Re-transmission is performed up to three times in IS-707, and it is the responsibility of higher layer protocols to take additional steps to ensure that frames are successfully received.

Recently, a need has arisen for transmitting audio information, such as voice, using the data protocols of IS-707. For example, in a wireless communications system employing cryptographic techniques, audio information may be more easily manipulated and distributed among data networks by encoding information at a transmitter using a data protocol. In such applications, it is desirable to maintain the use of existing data protocols to minimize changes to existing infrastructure. However, problems occur when transmitting voice using a data protocol, due to the nature of voice characteristics.

One of the primary problems of transmitting audio information using a data protocol is the delay in transmitting information between a transmitter and a receiver. Such a delay, known as latency, may be associated with frame re-transmissions inherent in an over-the-air data protocol such as RLP, or it may be due to the insertion of other information, such as signaling information, into a voice transmission. Delays of more than a few hundred milliseconds in speech can result in unacceptable voice quality. When transmitting data, such as computer files, time delays are easily tolerated due to the non real-time nature of data. As a consequence, the protocols of IS-707 can afford to use the frame re-transmission scheme as described above, which may result in transmission delays, or a latency period, of more than a few seconds. Such a latency period is unacceptable for transmitting voice information.

What is needed is a method and apparatus for minimizing the problems of latency. Furthermore, the method and apparatus should be backwards-compatible with existing infrastructure to avoid expensive upgrades to those systems.

SUMMARY OF THE INVENTION

The present invention is a method and apparatus for reducing voice latency associated with a voice-over-data wireless communication system. Generally, this is achieved by altering a data encoding rate, or data rate, of a voice encoder operating within a transmitter.

In a first embodiment of the present invention, audio information, such as human speech, is encoded into data packets, or vocoder frames, by a voice encoder located in a transmitter. Under normal conditions, the voice encoder is operated in a first mode of operation. A processor located within the transmitter measures at least one operational parameter of the transmitter, the at least one operational parameter proportional to a latency between the transmitter and a receiver. If one or more of the operational parameters exceed a predetermined threshold, indicating increased latency, the processor instructs the voice encoder to operate in a second mode of operation.

In one embodiment, the first mode of operation comprises operating the voice encoder at a fixed data rate and the second mode of operation comprises operating the voice encoder at a second fixed data rate.

In another embodiment, the first mode of operation comprises operating the voice encoder at a set of data rates and the second mode of operation comprises operating the voice encoder at a fixed data rate.

In another embodiment, the first mode of operation comprises operating the voice encoder at a fixed data rate and the second mode of operation comprises operating the voice encoder at a set of data rates.

In vet another embodiment, the first mode of operation comprises operating the voice encoder at a first set of data rates and the second mode of operation comprises operating the voice encoder at a second set of data rates.

In general, when latency increases to an unacceptable level, as measured by at least one operational parameter in the transmitter, the voice encoder is operated in a second mode so that less information, on average, is encoded and readied for over-the-air transmission. By encoding less information, fewer frames are produced, thereby allowing a reduction in frames awaiting transmission in a queue in the transmitter. When latency returns to an acceptable level, the voice encoder is operated in the first mode.

In another embodiment, the present invention is an apparatus for reducing voice latency in a voice-over-data wireless communication system, comprising a voice encoder for encoding audio information into data frames at a transmitter, and a processor for determining the value of at least one operating parameter within said transmitter. The at lease one operating parameter is proportional to a latency between said transmitter and a receiver. The processor further compares the at least one operating parameter to a predetermined threshold. The voice encoder is operated in a first mode of operation if the at least one operating parameter is less than the predetermined threshold and operated in a second mode of operation if the at least one operating parameter is greater than the predetermined threshold.

DETAILED DESCRIPTION OF THE PREFERRED EMBODIMENTS

The embodiments described herein are described with respect to a wireless communication system operating in accordance with the use of CDMA signal processing techniques of the IS-95, IS-707, and IS-99 Interim Standards. While the present invention is especially suited for use within such a communications system, it should be understood that the present invention may be employed in various other types of communications systems that transmit information in discreet packets, otherwise known as data packets, data frames, or simply frames, including both wireless and wireline communication systems, and satellite-based communication systems. Additionally, throughout the description, various well-known systems are set forth in block form. This is done for the purpose of clarity.

Various wireless communication systems in use today employ fixed base stations that communicate with mobile units using an over-the-air interface. Such wireless communication systems include AMPS (analog), IS-54 (North American TDMA), GSM (Global System for Mobile communications TDMA), and IS-95 (CDMA). In a preferred embodiment, the present invention is implemented in a CDMA system.

Figure 1:
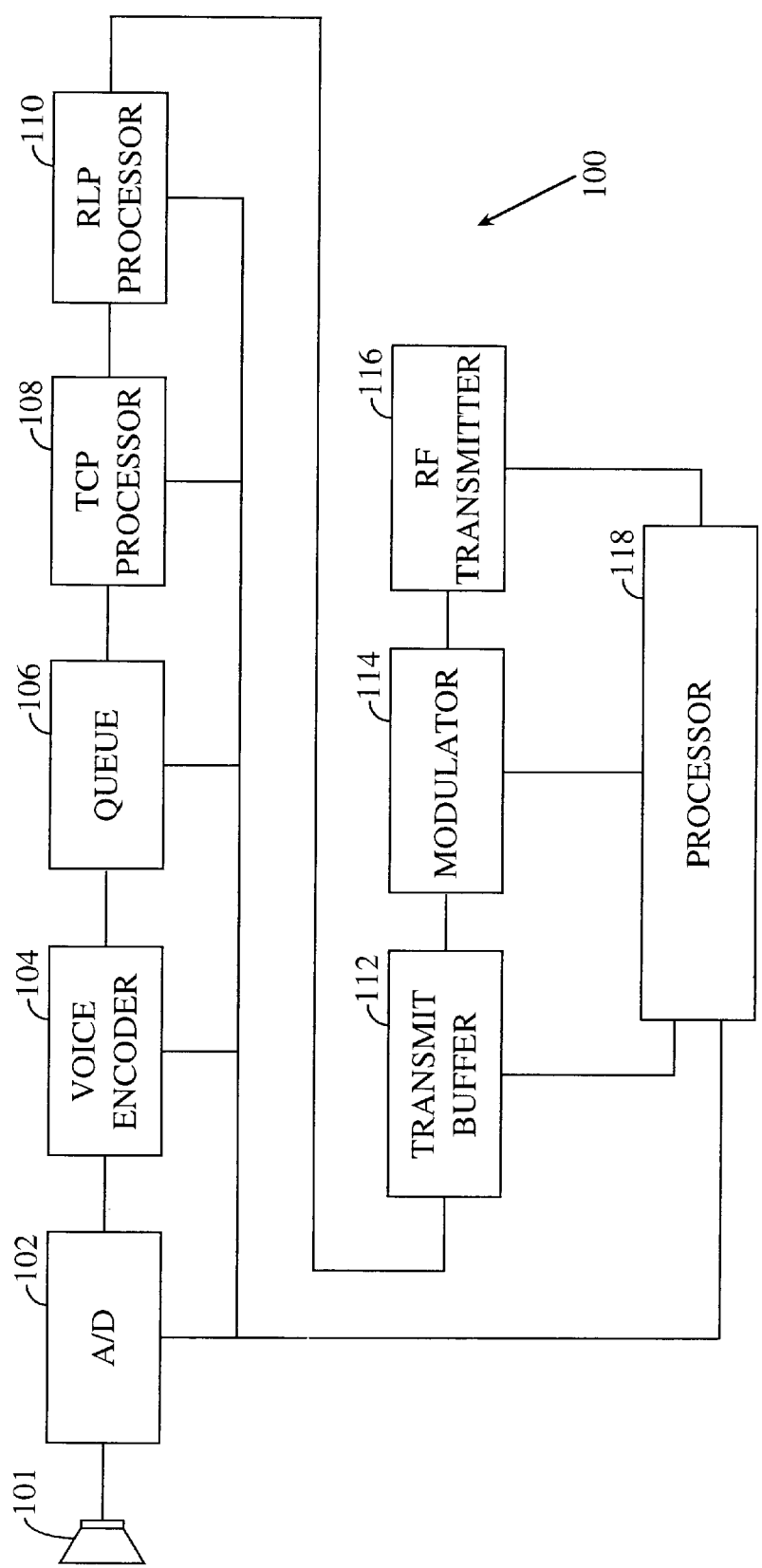
FIG. 1 illustrates the present invention, in functional block diagram format, as used within a transmitter.

FIG. 1 illustrates the present invention, in functional block diagram format, as used within a transmitter 100. It should be understood that the transmitter shown in FIG. 1 is representative of only one type of transmitter, and that other transmitters may operate with a greater or fewer number of functional blocks, or that the blocks may be rearranged. Transmitter 100 is configured to transmit information, typically human speech, wirelessly by encoding the information into data packets suitable for transmission over a data network, such as the Internet. Such a communication system is referred to herein as a voice-over-data communication system and may refer to any communication system where time-sensitive information, i.e. real-time information, is transmitted in data segments, segments, data packets or frames using data protocols. Examples of time-sensitive information includes audio information, such as human speech, or video information, such as television signals or movies. The term "voice-over-data" generally refers to a communication system which transmits human speech, or voice, using predefined data protocols, such as the well-known TCP or UDP data protocols.

Transmitter 100 is shown configured for use in an exemplary embodiment of the present invention. Such a transmitter 100 may be located in a base station or in a mobile telephone as used in a wireless communication system. It should be understood that FIG. 1 is a simplified block diagram of a complete transmitter and that other functional blocks have been omitted for clarity. Transmitter 100 as shown in FIG. 1 is not intended to be limited to any one particular type of transmission modulation, protocol, or standard. In addition, the functions of each block may reside in single or multiple processors executing preprogrammed instruction sets, may reside in one or more ASICS, or may reside in discreet processing elements, all of which are well known in the art.

As shown in FIG. 1, time-sensitive information, such as audio or video information, is provided to transducer 101 where it is converted into an electrical signal, typically in analog format. Transducer 101 is commonly a microphone or a video capture device such as a camera. The electrical signal is provided to analog-to-digital (A/D) converter 102. A/D 102 uses well-known techniques to transform the analog electrical signal into a digital signal, typically in the form of a pulse code modulated (PMC) signal. A/D 102 may perform other functions, such as low-pass filtering, sampling, quantizing, and binary encoding on the time-sensitive information to produce the digital signal, as is well known in the art.

The digital signal from A/D 102 is then provided to voice encoder 104. Voice encoder 104 is a well-known device for removing the natural redundancies found in human speech in order to minimize the bandwidth needed for over-the-air transmission. Voice encoder 104 generates discreet packets of data, often referred to as vocoder frames, at regular time intervals, such as every 20 milliseconds in one embodiment of the present invention, although other time intervals could be used in the alternative. The length of each data frame is generally a fixed value, measured in milliseconds. Voice encoder 104 may operate in tandem with a voice-decoder, the two commonly known as a vocoder.

Voice encoders generally operate by encoding digital signal using a fixed data encoding rate, or data rate. The encoding rate ultimately dictates the number of bits comprising each vocoder frame. For example, a first voice encoder may operate at a first data encoding rate, generating vocoder frames comprising 192 bits per frame, each vocoder frame generated once every 20 milliseconds. A second voice encoder may operate at a second data encoding rate, generating vocoder frames comprising 48 bits per frame, each vocoder frame generated once every 30 milliseconds, and so on.

Voice encoders may be further enhanced by encoding digital signals at variable encoding rates. An example of such a variable rate voice encoder is found in U.S. Pat. No. 5,414,796 (the '796 patent) entitled "VARIABLE RATE VOICE ENCODER", assigned to the assignee of the present invention and incorporated by reference herein. When little or no information is available for transmission, variable rate voice encoders encode data at reduced data rates, thus increasing the transmission capacity of a wireless communication system. In the variable rate voice encoder described by the '796 patent, vocoder frames comprise data encoded at either full, one half, one quarter, or one eighth the data rate of the highest encoding rate. Each encoding rate generates vocoder frames having a corresponding number of bits within the frames. For example, in one embodiment, a vocoder frame generated at full rate comprises 192 bits, a half rate frame comprises 96 bits, a quarter rate frame comprises 48 bits, and an eighth frame comprises 24 bits.

Referring back to FIG. 1, Vocoder frames generated by voice encoder 104 are stored in a queue 106, or sequential memory, to be later digitally modulated and then upconverted for wireless transmission. Queue 106 is a memory for storing sequential vocoder frames from voice encoder 104, then providing the vocoder frames to TCP processor 108 on a first in, first out basis.

TCP processor is a computing device which converts vocoder frames into data packets suitable for transmission over a data network, such as the Internet. In one embodiment, vocoder frames are converted into data packets in accordance with the well-known TCP protocol. Other protocols may be used in the alternative, such as UDP. TCP processor 108 may comprise a hardware device, either discreet or integrated, or it may comprise a microprocessor running a set of computer instructions specifically designed to convert vocoder frames into data packets suitable for the chosen data protocol.

The data packets generated by TCP processor 108 are provided to RLP processor 118, where they are converted into data frames suitable for over-the-air transmission. In one embodiment, RLP processor converts the TCP data packets from TCP processor 118 into data frames in accordance with the well-known radio link protocol (RLP). RLP specifies data to be transmitted in 20 millisecond frames. In accordance with IS-99, RLP frames comprise an RLP frame sequence field, an RLP frame type field, a data length field, a data field for storing information from TCP data packets provided by TCP processor 118, and a field for placing a variable number of padding bits. Of course, other over-the-air protocols could be used instead of RLP.

RLP processor 118 receives TCP data packets from TCP processor 108 and typically stores the TCP data packets in a buffer (not shown). RLP frames are then generated from the TCP data packets using techniques well-known in the art. As RLP frames are produced by RLP processor 118, they are placed into transmit buffer 112. Transmit buffer 112 is a storage device for storing RLP frames prior to transmission, generally on a first-in, first-out basis. Transmit buffer 112 provides a steady source of RLP frames to be transmitted, even though a constant rate of RLP frames is generally not supplied by RLP processor 410. Transmit buffer 112 is a memory device capable of storing multiple RLP frames, typically 100 frames or more. Such memory devices are commonly known in the art.

RLP frames are removed from transmit buffer 112 at predetermined time intervals equal to 20 milliseconds in one embodiment. The RLP frames are then provided to modulator 114, which modulates the data frames in accordance with the chosen modulation technique of the communication system, for example, AMPS, TDMA, CDMA, or others. In the exemplary embodiment, modulator 114 operates in accordance with the teachings of IS-95. After the RLP frames have been modulated, they are provided to RF transmitter 116 where they are upconverted and transmitted, using techniques well-known in the art.

Processor 118 comprises any well-known processing device, such as a digital signal processor, a discreet device, or an ASIC. Processor 118 may coordinate the various activities occurring within transmitter 100, or the activities may be carried out by one or more individual processors, each assigned one or more specific tasks.

Figure 2:
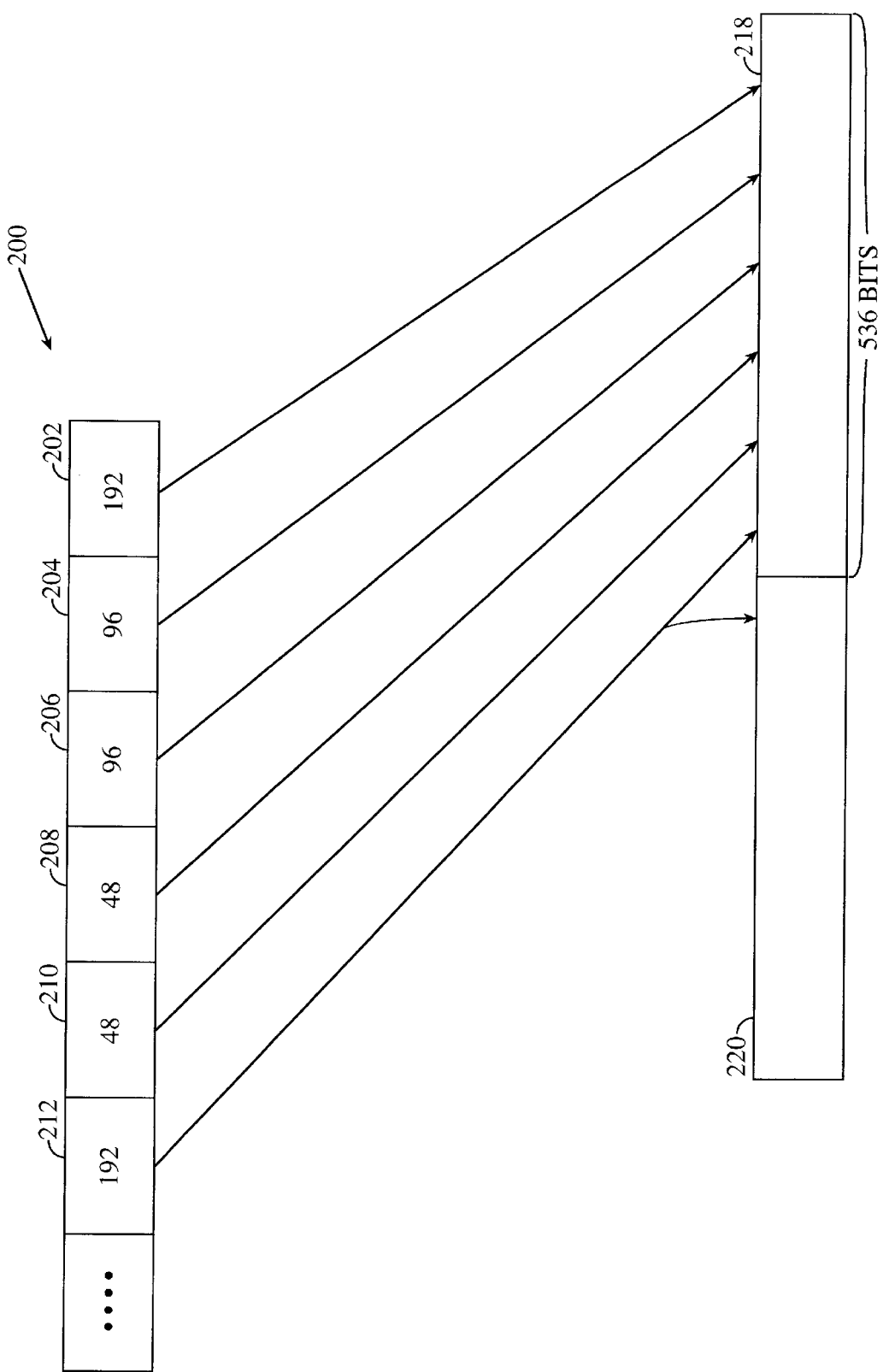
FIG. 2 illustrates how vocoder frames are converted into TCP data packets by a TCP processor residing within the transmitter of FIG. 1.

FIG. 2 illustrates how vocoder frames stored in queue 106 are converted into TCP data packets by TCP processor 108. Data stream. 200 represents the contents of queue 106, shown as a series of sequential vocoder frames, each vocoder frame having a frame length of 20 milliseconds. It should be understood that other voice encoders could generate vocoder frames having frame lengths of a greater or smaller duration.

As shown in FIG. 2, each vocoder frame contains a number of information bits depending on the data rate for the particular frame. In the present example of FIG. 2, vocoder frames contain data bits equal to 192 for a full rate frame, 96 bits for a half rate frame, 48 bits for a quarter rate frame, and 24 bits for an eighth rate frame. As explained above, frames having high data rates represent periods of voice activity, while frames having lower data rates are representative of periods of less voice activity or silence.

TCP processor 108 fills a TCP data packet sequentially with bits contained in each vocoder frame from queue 106. For example, in FIG. 2, the 192 bits contained within vocoder frame 202 are first placed within TCP data packet 218, then the 96 bits from vocoder frame 204, and so on until 536 bits have been placed within TCP data packet 218. Note that vocoder frame 212 is split between TCP data packet 218 and TCP data packet 220 as needed to fill TCP data packet 218 with 536 bits.

It should be understood that TCP data packets are not generated by TCP processor 108 on a continuous basis, due to the nature of variable rate vocoder frames. If no information is available for transmission in queue 106, a long series of low-rate vocoder frames will be produced by voice encoder 104. Therefore, many low-rate vocoder frames will be needed to fill the 536 bits needed for a TCP data packet, and, thus, a TCP data packet will be produced more slowly. Conversely, if high voice activity is present, a series of high-rate vocoder frames will be produced by voice encoder 104. Therefore, relatively few vocoder frames will be needed to fill the 536 bits necessary for a TCP data packet. Thus, a TCP frame will be generated more quickly.

Latency may be caused by several factors, one of which is an increase in the number of RLP frames waiting to be transmitted in transmit buffer 112. Having a large number of frames in transmit buffer 112 means that a newly added frame to transmit buffer 112 must wait for all the other frames previously stored in transmit buffer 112 to be transmitted. An increase in the number of frames stored in transmit buffer 112 may be caused by poor communication channel quality between transmitter 100 and a receiver. This, in turn, necessitates the use of frame re-transmissions, as is well known in the art. It could also be caused by additional information being interleaved with the voice data, such as signaling information to maintain the air interface. Each non-voice interleaved RLP frame causes an additional backup of voice RLP frames in transmit buffer 112. Finally, re-transmissions can occur at the TCP level. For example, rather than the re-transmission of individual RLP frames, the TCP protocol may require a TCP frame re-transmitted. The TCP frame to be re-transmitted often encompasses many RLP frames, thus creating a large backup in transmit buffer (or in queue 106) rather quickly.

When latency increases to a point as to cause noticeable delays in audio transmissions, the present invention alters the operation of voice encoder 104 to generate vocoder frames at an encoding rate less than the encoding rate used when latency is not a problem. In general, processor 118 measures at least one operating parameter of transmitter 100 to determine the latency between transmitter 100 and a receiver, then instructs voice encoder 104 to operate in a different data encoding rate.

In one embodiment of the present invention, voice encoder 104 operates in a first operating mode, generating vocoder frames using a fixed encoding rate, if latency is not a problem. Processor 118 determines latency by determining the number of RLP frames stored in transmit buffer 112 at predetermined time periods. If the number of RLP frames stored in transmit buffer 112 is less than a predetermined number of frames, voice encoder 104 is allowed to continue generating vocoder frames at the fixed encoding rate. However, when the number of frames stored in transmit buffer 112 exceeds the predetermined number of frames, processor 118 sends a command to voice encoder 104 to operate in a second mode of operation. The second mode of operation comprises either a fixed encoding rate or a set of encoding rates.

In the fixed encoding rate scenario, voice encoder 104 encodes information at a second fixed rate, the second fixed rate generally at a lower encoding rate than the first encoding rate. By reducing the coding rate of voice encoder 104 in the second mode, fewer bits per vocoder frame are produced. Ultimately, this means that TCP frames, and thus RLP frames, are generated at a slower rate, allowing transmit buffer 112 to deplete the pending frames more quickly than they can be restored from RLP processor 110. Eventually, the number of frames stored in transmit buffer 112 decrease below the predetermined threshold, or a second threshold in another embodiment. When the number of frames drops below the predetermined threshold, processor 118 instructs voice encoder 104 to return to the first mode of operation, encoding information at the first data rate.

In the alternative, the second mode of operation comprises operating voice encoder 104 at a set of data encoding rates. In this embodiment, when the number of frames in transmit buffer 112 exceeds the predetermined threshold, indicating an unacceptable level of latency, processor 118 instructs voice encoder 104 to encode data using multiple encoding rates. In other words, voice encoder 104 is operated as a variable rate vocoder, as described above. As explained above, in one embodiment, voice encoder 104 encodes data at one of four rates, depending on the level of voice activity in the information signal. By operating voice encoder 104 at a set of encoding rates, an average encoding rate results, which may be less than the fixed rate. In another embodiment, the set of encoding rates is chosen such that the highest encoding rate is less than or equal to the fixed encoding rate of the first mode of operation. This will increase the chances of an average encoding rate being less than the fixed encoding rate. For example, in the first mode of operation, the fixed encoding rate may be equal to half rate. When the second mode of operation is entered, vocoder 104 encodes vocoder frames at either half rate, quarter rate, or eighth rate. In another example, in the second mode of operation, vocoder frames are encoded at either quarter rate or eighth rate.

In another embodiment of the present invention, voice encoder 104 is operated in a first mode of operation when at least one operating parameter is less than a predetermined threshold. In this embodiment, the first mode of operation comprises operating voice encoder 104 at a set of encoding rates, thereby operating voice encoder 104 as a variable rate vocoder, as described above. Processor 118 determines the value of at least one operating parameter of transmitter 100, such as the number of frames stored in transmit buffer 112. If the number of frames in transmit buffer 112 is less than a predetermined number of frames, representing an acceptable level of latency, voice encoder 104 is operated in the first mode of operation as a variable-rate vocoder. If the number of frames stored in transmit buffer 112 exceeds the predetermined number of frames, indicating unacceptable latency, processor 118 instructs voice encoder 104 to operate in the second mode of operation at either a fixed encoding rate or a second set of encoding rates.

In the fixed encoding rate scenario, voice encoder 104 encodes information at a fixed encoding rate. The rate is chosen so that it is less than the average encoding rates of the frames produced in the first mode of operation. Again, this reduces the average number of bits per vocoder frame, and therefore the rate at which TCP frames and RLP frames are produced. This allows transmit buffer 112 to deplete the pending frames more quickly than they can be restored from RLP processor 110. Eventually, the number of frames stored in transmit buffer 112 decrease below the predetermined threshold, or a second threshold in another embodiment. When the number of frames stored in transmit buffer 112 drops below the predetermined threshold, processor 118 instructs voice encoder 104 to return to the first mode of operation, encoding information at the set of data encoding rates.

In the alternative, the second mode of operation comprises operating voice encoder 104 at a second set of data encoding rates. In an alternative embodiment, a second voice encoder 104 is used to encode voice data at the second set of encoding rates. In either case, when the number of frames in transmit buffer 112 exceeds the predetermined threshold, indicating an unacceptable level of latency, processor 118 instructs voice encoder 104 to encode data using the second set of data encoding rates. The second set of data encoding rates are chosen to encode data at an average encoding rate less than the first set of encoding rates. This may be accomplished by eliminating one or more of the higher data encoding rates from the first set of encoding rates. For example, if the first set of encoding rates are chosen as full rate, half rate, quarter rate, and eighth rate, the second set of encoding rates could be chosen as half rate, quarter rate, and eight rate. Alternatively, the second set of data encoding rates comprises the same number of encoding rates with one or more of the second set of encoding rates less than a respective encoding rate in the first set of encoding rates. For example, if the first set of encoding rates are chosen as full rate, half rate, quarter rate, and eighth rate, the second set of encoding rates could comprise full rate, three-quarter rate, quarter rate, and eighth rate. Or the second set of encoding rates could comprise seven-eighths rate, five-eighths rate, three-eighth rate, and eighth rate. Of course, other combinations are possible.

In other embodiments, processor 118 determines transmission latency by monitoring other operating parameters of transmitter 100. For example, processor 118 can determine a number NAKs received over a predetermined time period to determine latency. NAKs are used to instruct transmitter 100 to re-transmit information, such as RLP frames, TCP frames; or signaling information, and are well-known in the art. When a NAK is received by transmitter 100, a re-transmission generally takes place, thereby preventing RLP frames stored in transmit buffer 112 from being transmitted. As a result, the number of frames stored in transmit buffer 112 increases during the re-transmission.

Processor 118 can estimate the latency by counting the number of NAKs received in a given period. As the number of NAKs received over a given time period increase, a greater number of re-transmissions take place, which in turn cause a buildup of frames in transmit buffer 112. When processor 118 determines that a predetermined number of NAKs have been received in a given time period, processor 118 instructs voice encoder 104 to operate in the second mode of operation.

Alternatively, or in conjunction with the NAK-counting process, processor 118 counts the number of re-transmitted frames associated with each NAK over a given time period to determine when latency has become unacceptable. In this embodiment, processor 118 determines when the number of re-transmitted frames exceed a predetermined threshold. When this occurs, processor 118 instructs voice encoder 104 to operate in the second mode of operation.

In yet another embodiment, processor 118 uses a combination of the just-described methods to determine when to operate voice encoder 104 in the second mode of operation. For example, processor 118 counts the number of re-transmitted frames over a given time period. When the number of re-transmitted frames exceeds a first predetermined threshold, processor 118 checks transmit buffer 112 to determine if the number of stored frames exceeds a second predetermined threshold. If both thresholds have been exceeded, processor 118 instructs voice encoder 104 to operate in the second mode of operation. Other variations are, of course, possible.

Figure 3:
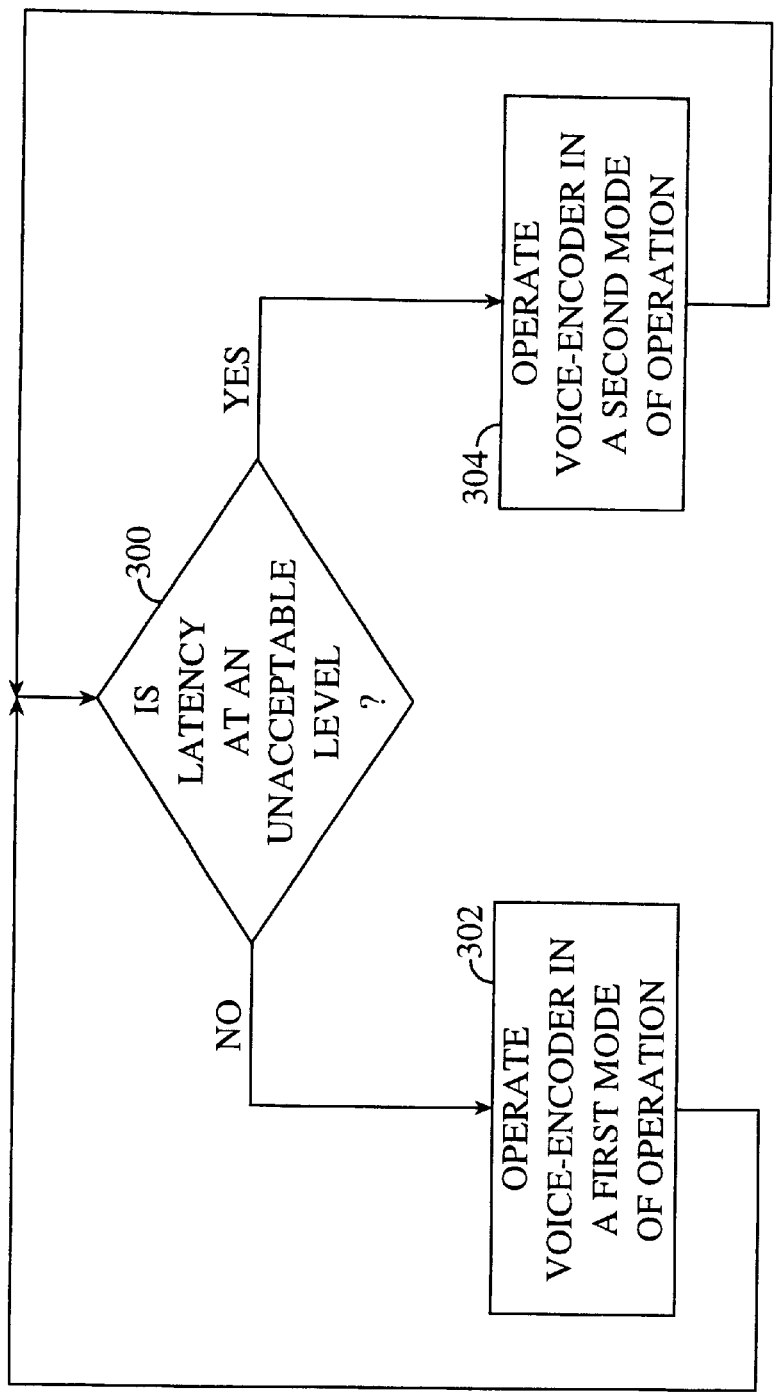
FIG. 3 illustrates a flow diagram of one embodiment of the present invention.

FIG. 3 is a flow diagram of the present invention, shown in a first embodiment. In step 300, processor 118 determines latency by determining at least one operating parameter of transmitter 100. In one embodiment, processor 118 determines the number of frames stored in transmit buffer 112 to determine the latency. If the latency is determined to be at an acceptable level, voice encoder 104 is operated in a first mode of operation, comprising operating voice encoder 104 at a first fixed encoding rate.

At some time later, processor 118 once again determines latency. If the latency is determined to be at an unacceptable level, processor 118 instructs voice encoder 104 to operate in a second mode of operation, in this embodiment, at a second fixed rate. In one embodiment of the present invention, the second encoding rate is less than the first encoding rate.

The preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A method for reducing voice latency in a voice-over-data wireless communication system, comprising the steps of:
   operating a voice encoder in a first mode of operation in a transmitter;
   measuring an operating parameter of said transmitter, said operating parameter proportional to a latency between said transmitter and a receiver;
   operating said voice encoder in a second mode of operation if said operating parameter exceeds a first predetermined threshold.

2. The method of claim 1 wherein the step of operating said voice encoder in a first mode of operation comprises operating said voice encoder at a first fixed data rate.

3. The method of claim 1 wherein the step of operating said voice encoder in a first mode of operation comprises operating said voice encoder at a first set of data rates.

4. The method of claim 1 wherein the step of operating said voice encoder in a second mode of operation comprises operating said voice encoder at a first predefined data rate.

5. The method of claim 1 wherein the step of operating said voice encoder in a second mode of operation comprises operating said voice encoder at a first set of data rates.

6. The method of claim 1 wherein the step of operating said voice encoder in a first mode of operation comprises operating said voice encoder at a first fixed data rate; and
   the step of operating said voice encoder in a second mode of operation comprises operating said voice encoder at a second fixed data rate, said second fixed data rate less than said first fixed data rate.

7. The method of claim 1 wherein the step of operating said voice encoder in a first mode of operation comprises operating said voice encoder at a set of data rates; and
   the step of operating said voice encoder in a second mode of operation comprises operating said voice encoder at a fixed data rate.

8. The method of claim 1 wherein the step of operating said voice encoder in a first mode of operation comprises operating said voice encoder at a fixed data rate; and
   the step of operating said voice encoder in a second mode of operation comprises operating said voice encoder at a set of data rates.

9. The method of claim 1 wherein the step of operating said voice encoder in a first mode of operation comprises operating said voice encoder at a first set of data rates; and the step of operating said voice encoder in a second mode of operation comprises operating said voice encoder at a second set of data rates.

10. An apparatus for reducing voice latency in a voice-over-data wireless communication system, comprising:

a voice encoder for encoding audio information into data frames at a transmitter;

a processor for determining the value of an operating parameter within said transmitter, said operating parameter proportional to a latency between said transmitter and a receiver, said processor further for comparing said operating parameter to a predetermined threshold, said processor further for controlling said voice encoder to operate in a first mode of operation if said operating parameter is less than said predetermined threshold and for controlling said voice encoder to operate in a second mode of operation if said operating parameter is greater than said predetermined threshold.

11. The apparatus of claim 10 wherein said first mode of operation comprises a fixed data rate.

12. The apparatus of claim 10 wherein said first mode of operation comprises a set of data rates.

13. The apparatus of claim 10 wherein said second mode of operation comprises a fixed data rate.

14. The apparatus of claim 10 wherein said second mode of operation comprises a set of data rates.

15. The apparatus of claim 10 wherein:

said first mode of operation comprises a first fixed data rate; and said second mode of operation comprises a second fixed data rate.

16. The apparatus of claim 10 wherein:

said first mode of operation comprises a fixed data rate; and said second mode of operation comprises a set of data rates.

17. The apparatus of claim 10 wherein:

said first mode of operation comprises a first set of data rates; and said second mode of operation comprises a second set of data rates.

18. The apparatus of claim 10 wherein:

said first mode of operation comprises a set of data rates; and said second mode of operation comprises a fixed data rate.

* * * * *